US012699276B2

(12) United States Patent
Vishnia et al.

(10) Patent No.: US 12,699,276 B2
(45) Date of Patent: Aug. 4, 2026

(54) MONOLITHIC BEAMSPLITTER ARRAY

(71) Applicant: PLX, Inc., Deer Park, NY (US)

(72) Inventors: Itai Vishnia, Setauket, NY (US); Malcolm Humphrey, Hicksville, NY (US)

(73) Assignee: PLX, Inc., Deer Park, NY (US)

( * ) Notice: Subject to any disclaimer, the term of this patent is extended or adjusted under 35 U.S.C. 154(b) by 264 days.

(21) Appl. No.: 18/669,110

(22) Filed: May 20, 2024

(65) Prior Publication Data

US 2024/0393609 A1    Nov. 28, 2024

Related U.S. Application Data

(60) Provisional application No. 63/503,823, filed on May 23, 2023.

(51) Int. Cl.
| | |
|---|---|
| *G02B 27/14* | (2006.01) |
| *G02B 17/00* | (2006.01) |
| *G02B 27/10* | (2006.01) |

(52) U.S. Cl.
CPC ......... *G02B 27/144* (2013.01); *G02B 17/002* (2013.01); *G02B 27/106* (2013.01)

(58) Field of Classification Search
CPC ... G02B 27/144; G02B 17/002; G02B 27/106
See application file for complete search history.

(56) References Cited

U.S. PATENT DOCUMENTS

| | | |
|---|---|---|
| 2015/0111287 A1 | 4/2015 | Rawle |
| 2020/0026090 A1* | 1/2020 | Hargis .............. G02B 27/0961 |
| 2022/0326379 A1 | 10/2022 | Humphrey et al. |

OTHER PUBLICATIONS

International Search Report and Written Opinion issued in PCT/US24/30355, mailed on Aug. 20, 2024.

* cited by examiner

*Primary Examiner* — Charles S Chang
(74) *Attorney, Agent, or Firm* — ICE MILLER LLP; Safet Metjahic

(57) ABSTRACT

A monolithic optical system for creating a plurality of equally spaced identical laser beams while maintaining pointing accuracy of the laser beams relative to each other with respect to both position and angle. The monolithic optical system includes a mirror configured to receive a laser beam in a first direction and reflect the laser beam in a second direction and a beamsplitter array having a first beamsplitter and a second beamsplitter. The first beamsplitter is configured to receive the laser beam from the mirror and direct the laser beam, emitting a first laser beam portion and redirecting a second laser beam portion to the mirror. The second beamsplitter is configured to receive the first laser beam portion and the second laser beam portion from the mirror and direct the first laser beam portion and the second laser beam portion, emitting a first part of the first laser beam portion and a first part of the second laser beam portion and redirecting a second part of the first laser beam portion and a second part of the second laser beam portion to the mirror. The mirror is configured to reflect the second part of the first laser beam portion and the second part of the second laser beam portion. An interface of the first beamsplitter adjoins an interface of the second beamsplitter.

20 Claims, 8 Drawing Sheets

1

MONOLITHIC BEAMSPLITTER ARRAY

CROSS REFERENCE TO RELATED APPLICATIONS

This application is entitled to and hereby claims priority under 35 U.S.C. § 119(e) to provisional U.S. patent application Ser. No. 63/503,823, filed May 23, 2023, titled, "Monolithic Structure Beamsplitter Array," which is hereby incorporated herein in its entirety.

TECHNICAL FIELD

The present disclosure relates generally to optics and laser technology, and more particularly to a device, system, and method for creating one or more rows of equally spaced identical laser beams while maintaining pointing accuracy of each of the beams relative to each other.

BACKGROUND

A beamsplitter is an optical device that splits a light beam into a reflected light beam and a transmitted light beam. Beamsplitters are typically constructed as cubes that are made from a pair of triangular glass prisms glued together using an adhesive such as, for example, polyester, epoxy, or urethane-based compound. The device is a critical component in many optical systems and is commonly used in a wide variety of applications and industries.

Multiple beamsplitters can be arranged as a beamsplitter array, and work together to split an incident light beam into several output beams. Each individual beamsplitter in the array divides the incoming beam into two parts, typically with specific ratios of reflection and transmission. Beamsplitter arrays are commonly used in applications such as, for example, multibeam interferometry to measure phase differences, parallel imaging system to split light for simultaneous imaging of different regions, and laser beam shaping to divide a laser beam into multiple spots.

The inventors have discovered an unfulfilled need for a system and methodology that enables the creation of a row of equally spaced identical laser beams, while maintaining the pointing accuracy of the beams relative to each other.

SUMMARY

The present disclosure provides a device, a system, and a method for creating one or more rows of equally spaced identical laser beams, while maintaining pointing accuracy of each of the beams relative to each other, including with respect to both position and angle; especially when the spacing between the beams is tight in comparison to the a laser spot size, and there is a requirement for each laser beam path length to be within a closer range.

According to an aspect of the disclosure, an optical system is provided for creating a plurality of equally spaced identical laser beams while maintaining pointing accuracy of the laser beams relative to each other with respect to both position and angle. The optical system includes a monolithic optical structure having a mirror and a beamsplitter array. The mirror has a reflective surface configured to receive a laser beam in a first direction and reflect the laser beam in a second direction. The beamsplitter array has a plurality of beamsplitters, including a first beamsplitter with a first interface and a second interface configured to receive the laser beam from the mirror at the first interface and direct the laser beam to the second interface, the second interface being configured to emit a first laser beam portion and redirect a second laser beam portion, via the first interface, to the mirror. The second beamsplitter has a first interface and a second interface, configured to receive, at its first interface, the first laser beam portion from the second interface of the first beamsplitter and the second laser beam portion from the mirror and direct the first laser beam portion and the second laser beam portion to its second interface, the second interface being configured to emit a first part of the first laser beam portion and a first part of the second laser beam portion and redirect a second part of the first laser beam portion and a second part of the second laser beam portion, via the first interface, to the mirror. The mirror is configured to reflect the second part of the first laser beam portion and the second part of the second laser beam portion. The second interface of the first beamsplitter adjoins the first interface of the second beamsplitter.

The optical system can include an intermediary interface positioned between and in contact with each of the second interface of the first beamsplitter and the first interface of the second beamsplitter.

The monolithic optical structure includes a plurality of support members, including a pair of planar support members. The monolithic optical structure can include a reflector. The included reflector can be made of a material having a coefficient of thermal expansion that is the same or substantially the same as the coefficients of thermal expansion of the mirror, the beamsplitter, and the pair of support members.

The mirror and the beamsplitter array can be preassembled, optically prealigned, and fixed between the pair of planar support members.

The mirror and the beamsplitter array can be made of a material having a coefficient of thermal expansion (CTE) that is the same or substantially the same as a coefficient of thermal expansion of the pair of planar support members. The material can include glass.

The laser beam can include a first beam component, a second beam component, a third beam component, and a fourth beam component, and the reflector can be configured to receive and redirect: the first part of the first laser beam portion from the second interface of the second beamsplitter to a first microreflector to output the first beam component; the first part of the second laser beam portion from the second interface of the second beamsplitter to a second microreflector to output the second beam component; the second part of the first laser beam portion from the mirror to a third microreflector to output the third beam component; and the second part of the second laser beam portion from the mirror to a fourth microreflector to output the fourth beam component. Each of the first, second, third, and fourth microreflectors can be configured to provide a similar or the same path length for each of the first, second, third, and fourth beam components.

The optical system can further include a reflector having a mirror surface configured to receive and redirect: the first part of the first laser beam portion from the second interface of the second beamsplitter to a first microreflector to output a first beam component; the first part of the second laser beam portion from the second interface of the second beamsplitter to a second microreflector to output a second beam component; the second part of the first laser beam portion from the mirror to a third microreflector to output a third beam component; and the second part of the second laser beam portion from the mirror to a fourth microreflector to output a fourth beam component, wherein each of the first, second, third, and fourth microreflectors are configured to provide a similar or the same path length for each of the first, second, third, and fourth beam components.

The beamsplitter array can include a third beamsplitter having a first interface and a second interface, wherein the first interface of the third beamsplitter is configured to receive the first part of the first laser beam portion from the second interface of the second beamsplitter and emit a component of the first part of the first laser beam portion and redirect another component of the first laser beam back to the first interface of the third beamsplitter. The first interface of the third beamsplitter adjoins the second interface of the second beamsplitter.

The beamsplitter array can include a fourth beamsplitter. A first interface of the fourth beamsplitter adjoins the second interface of the third beamsplitter. The first interface of the third beamsplitter adjoins the second interface of the second beamsplitter.

According to a further aspect of the disclosure, an optical system is provided for creating a plurality of equally spaced identical laser beams while maintaining pointing accuracy of the laser beams relative to each other with respect to both position and angle. The optical system includes a mirror having a reflective surface configured to receive a laser beam in a first direction and reflect the laser beam in a second direction, and a beamsplitter array. The beamsplitter array includes: a first beamsplitter, having a first interface and a second interface, configured to receive the laser beam from the mirror at the first interface and direct the laser beam to the second interface, the second interface being configured to emit a first laser beam portion and redirect a second laser beam portion, via the first interface, to the mirror; and a second beamsplitter, having a first interface and a second interface, configured to receive, at its first interface, the first laser beam portion from the second interface of the first beamsplitter and the second laser beam portion from the mirror and direct the first laser beam portion and the second laser beam portion to its second interface, the second interface being configured to emit a first part of the first laser beam portion and a first part of the second laser beam portion and redirect a second part of the first laser beam portion and a second part of the second laser beam portion, via the first interface, to the mirror. The optical system can also include a reflector assembly configured to redirect a plurality laser beam components from the beamsplitter array and the mirror and output equally spaced identical laser beams, while maintaining pointing accuracy of the laser beams relative to each other, both position wise and angular wise.

The optical system can include an intermediary interface positioned between and in contact with each of the second interface of the first beamsplitter and the first interface of the second beamsplitter.

The optical system can include a monolithic optical structure having a pair of support members, wherein the monolithic optical structure comprises the mirror and the beamsplitter array sandwiched between the pair of support members and fixedly held in optical alignment, and wherein each of the mirror, the beamsplitter array, and the pair of support members are each made of a material having a similar or the same coefficient of thermal expansion. The monolithic optical structure can include a reflector, the reflector being made of a material having a coefficient of thermal expansion that is the same or substantially the same as the coefficients of thermal expansion of the mirror, the beamsplitter, and the pair of support members. The mirror, the beamsplitter array, and the pair of support members can each comprise glass.

In the optical system, the laser beam comprises a first beam component, a second beam component, a third beam component, and a fourth beam component, and the reflector assembly can comprise a plurality of micromirror devices configured to receive: the first part of the first laser beam portion at a first micromirror device and output the first beam component; the first part of the second laser beam portion at a second micromirror device and output the second beam component; the second part of the first laser beam portion at a third micromirror device and output the third beam component; and the second part of the second laser beam portion at a fourth micromirror device and output the fourth beam component, wherein each of the first, second, third, and fourth microreflectors are configured to provide a similar or the same path length for each of the first, second, third, and fourth beam components.

According to a further aspect of the disclosure, a data memorialization device is provided, comprising a controller, a laser generator, a beamsplitter array, an MSM array assembly, and an optical recording unit. The optical recording unit can include a read/write unit. The controller can include an MSM array driver.

In various embodiments, the data memorialization device can include the optical structure or monolithic optical structure discussed above.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a monolithic part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
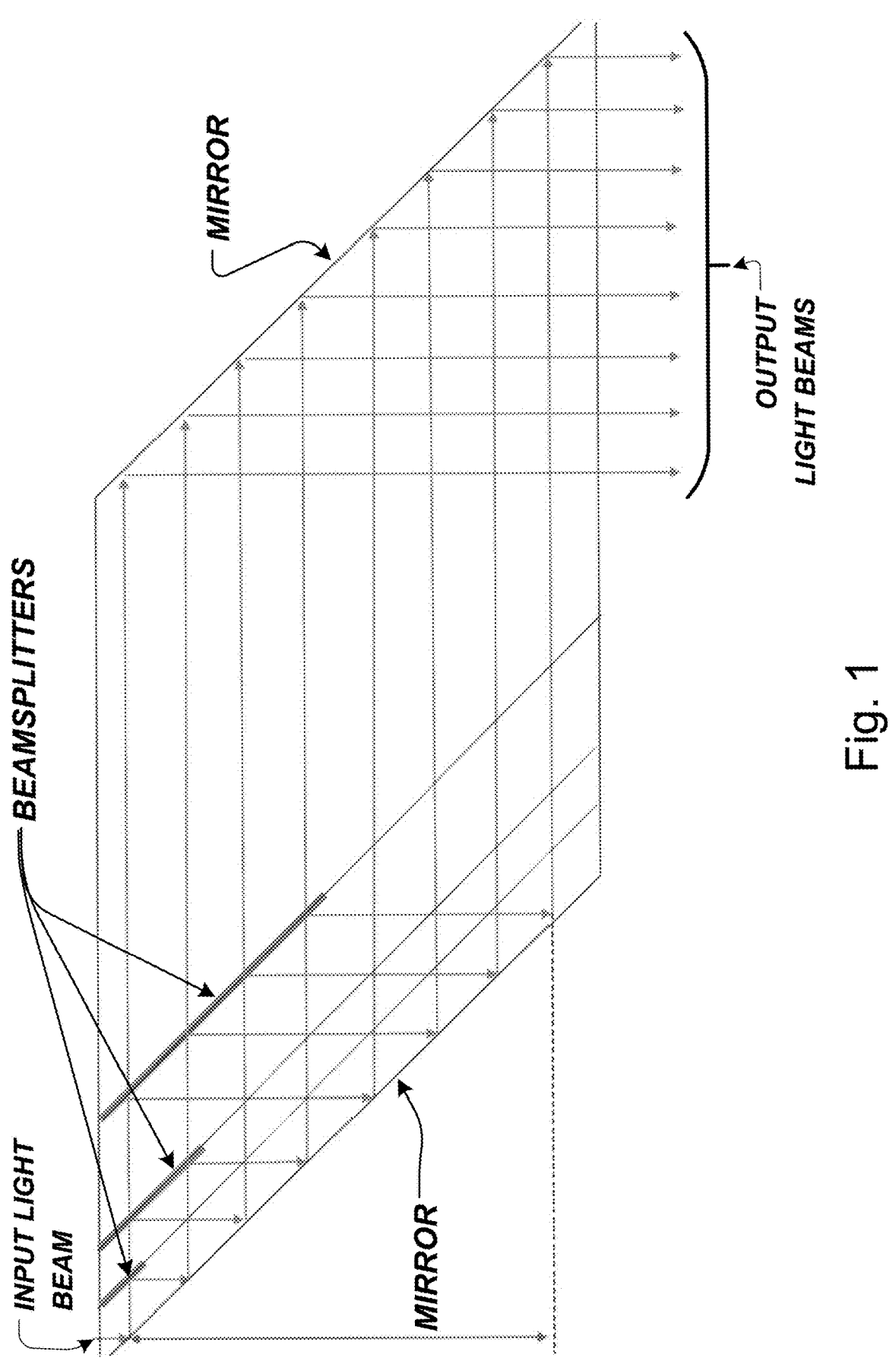
FIG. 1 shows an example of a state-of-the-art beamsplitter array.

The present disclosure is further described in the detailed description that follows.

DETAILED DESCRIPTION

The disclosure and its various features and advantageous details are explained more fully with reference to the nonlimiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar monolithic parts throughout the several views of the drawings.

FIG. 1 shows an example of a state-of-the-art beamsplitter array that can be used to split a single input laser beam into a plurality of output laser beams. The beamsplitter array comprises a pair of mirrors and three beamsplitters. The mirrors are positioned parallel to each other and at a 45-degree angle with respect to the direction of the input light beam. The beamsplitters are also positioned parallel to each other and at the same angle as that of the mirrors. The beamsplitter array, however, has a number of significant drawbacks.

For instance, the beamsplitters are unable to create narrow beam separations because of beam size limitations and optical component size restrictions. The beamsplitters are also unable to control and confine the path length of each beam within a narrow range. As seen in FIG. 1, the path length traveled by the beam on the right-most output is significantly larger than the path length traveled by the beam on the left-most output. Further, the beamsplitters are unable to achieve a high level of accuracy because the installation of each optical component impacts the accuracy of all the output beams, and any imperfections in the optical components has a compounded effect on the output beams. Still further, because the optical components in the beamsplitter array can be made of materials having different coefficients of thermal expansion ("CTE"), performance and accuracy of the beamsplitters and/or mirrors can vary with changing temperature.

Figure 2:
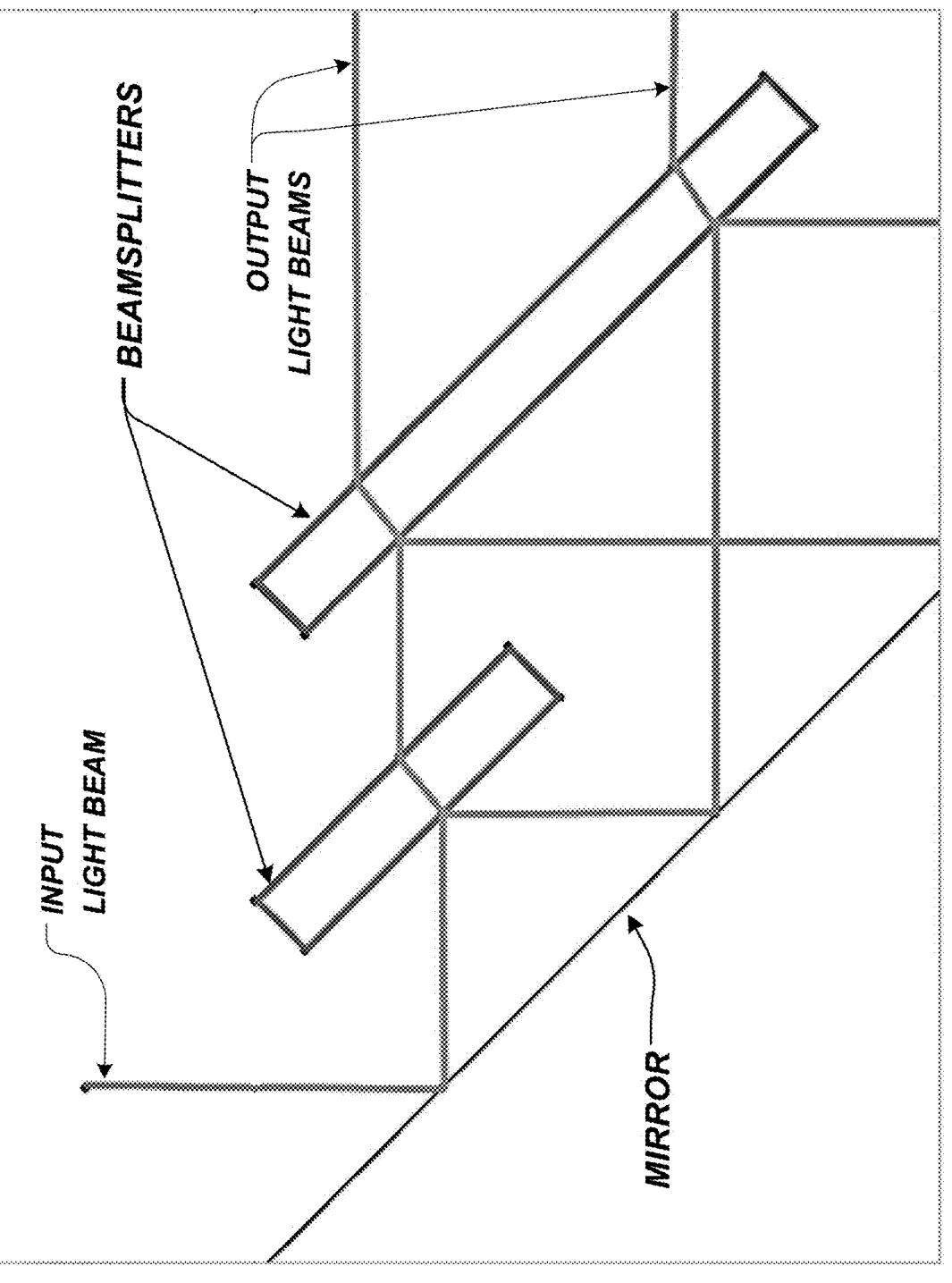
FIG. 2 shows an enlarged view of a portion of another example of a state-of-the-art beamsplitter array.

FIG. 2 shows a partial view of an example of a state-of-the-art beamsplitter array that attempts to address the problem of significantly different beam path lengths in the beamsplitter array of FIG. 1. However, this beamsplitter array too suffers from the drawbacks discussed above. For example, to address the problem of the significantly different path lengths, the beamsplitters must be sized to dimensions that are difficult to make using state-of-the-art manufacturing technologies. And, assuming the beamsplitters are made with the requisite dimensions, the beamsplitters would need to be supported by structures (for example, metal supports) that have significantly different coefficients of thermal expansion than that of the beamsplitters (for example, glass), thereby rendering the performance of the beamsplitters susceptible to changing temperatures and limiting their usability at temperatures that are significantly below or above (for example, +20° C., or more) the baseline temperature at which the beamsplitter array is made.

Figure 3:
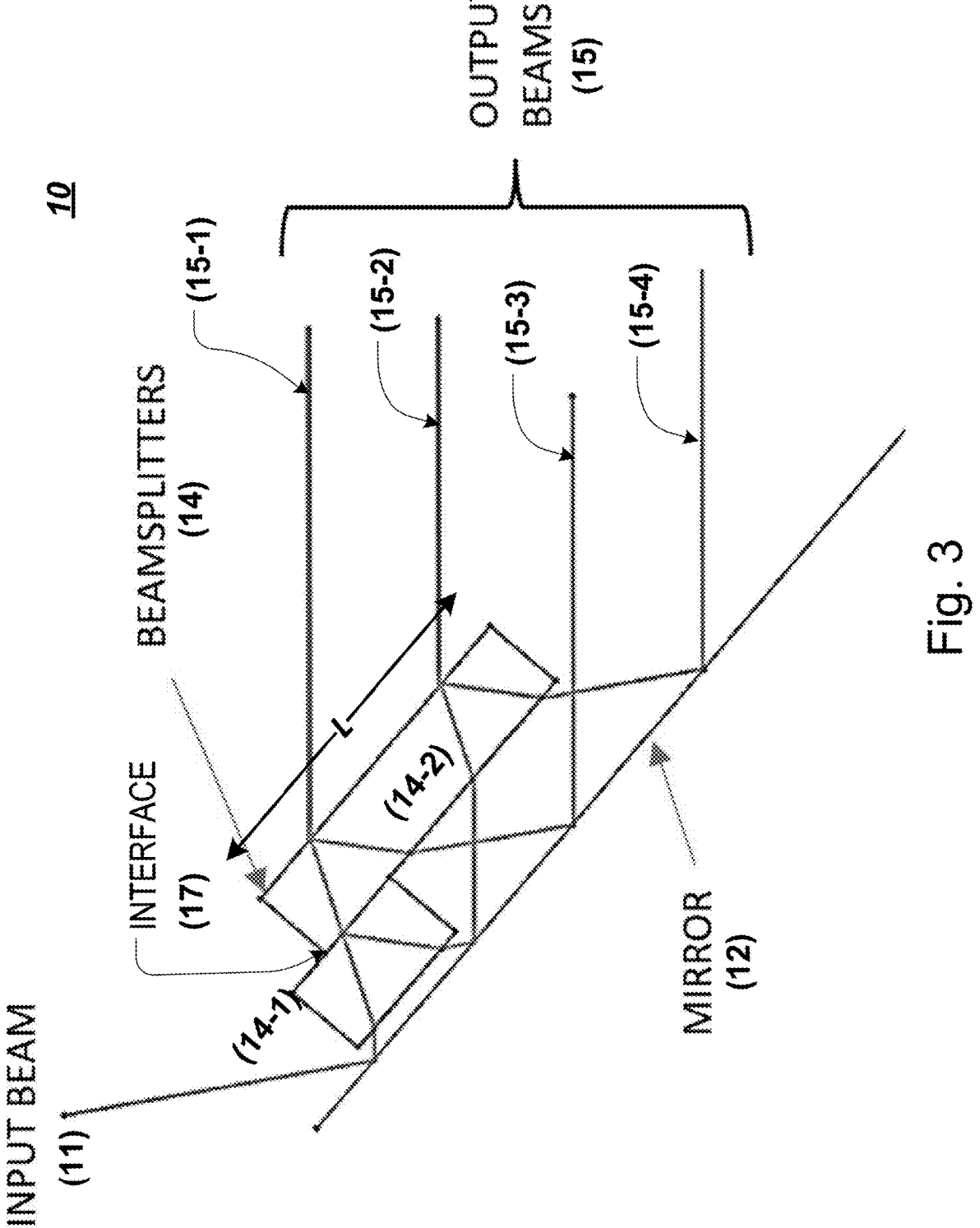
FIG. 3 shows a beamsplitter array constructed according to the principles of the disclosure.

FIG. 3 shows a nonlimiting embodiment of a beamsplitter array 10 constructed according to the principles of the disclosure. The beamsplitter array 10 comprises a mirror 12 and a beamsplitter doublet 14 consisting of two beamsplitters 14-1 and 14-2 adjoined to each other and configured (in conjunction with the mirror) to split an input laser light beam 11 into four narrowly spaced output laser light beam components 15-1, 15-2, 15-3, 15-4, which are output from the beamsplitter array 10 as a beam array 15. The two beamsplitters 14-1, 14-2 can be adjoined by providing an intermediary interface 17 between adjoining surfaces of the beamsplitters. The intermediary interface 17 can include, for example, a coating layer of a suitable adhesive, such as, for example, polyester, or a urethane-based compound.

Figure 6:
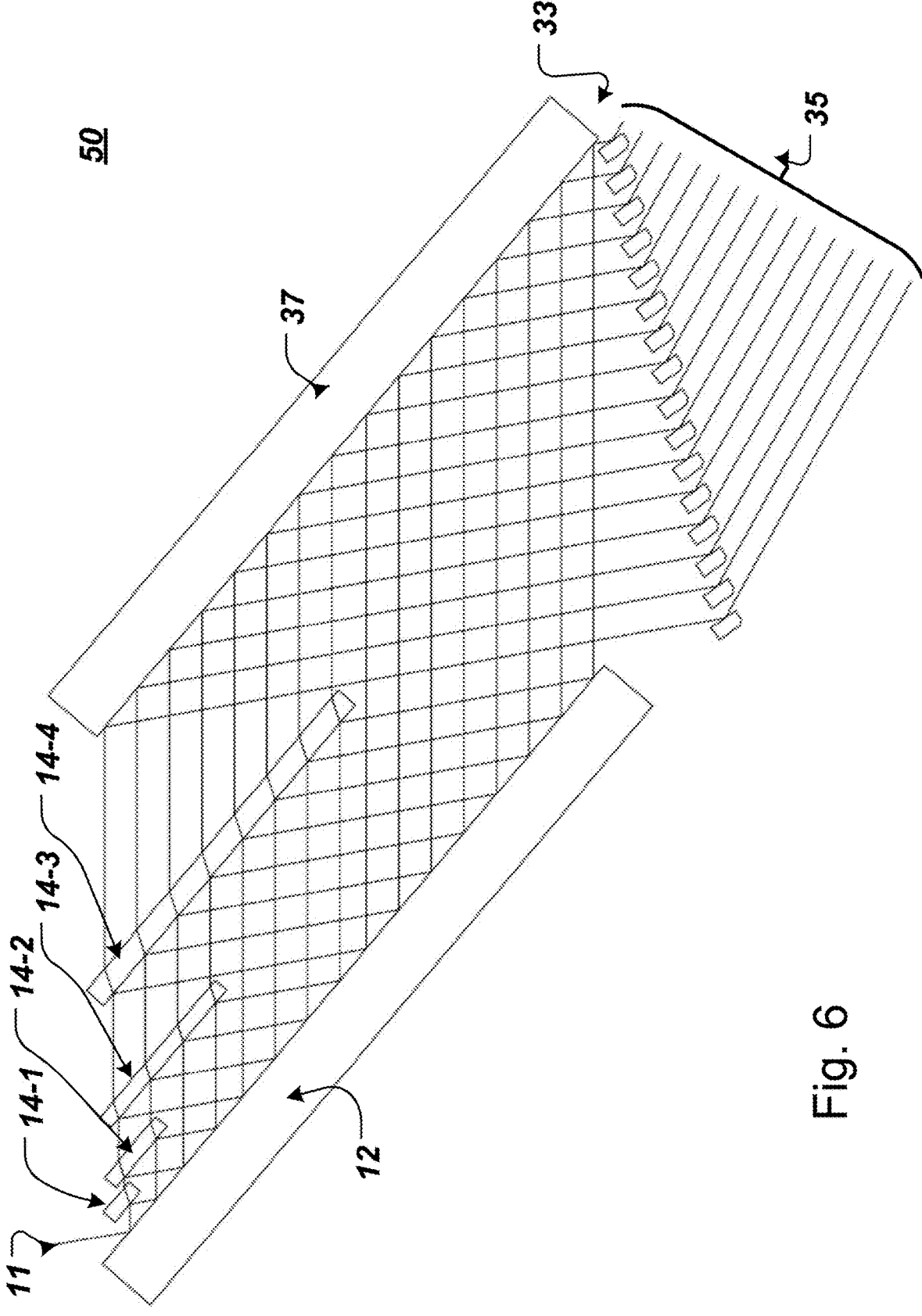
FIG. 6 shows a nonlimiting embodiment of an optical system comprising a beamsplitter array and multibeam steering mirror array assembly, according to the principles of the disclosure.

In various embodiments, the beamsplitter array 10 includes two beamsplitters (i.e., the beamsplitter doublet seen in FIG. 3, comprising beamsplitters 14-1 and 14-2), three beamsplitters (e.g., a beamsplitter triplet comprising beam splitters 14-1, 14-2, and 14-3, seen in FIG. 6), four beamsplitters (e.g., a beamsplitter quadruplet 14-1, 14-2, 14-3, and 14-4, seen in FIG. 6), or five or more beamsplitters, with an interface 17 between each adjoining pair of beamsplitters.

Figure 5:
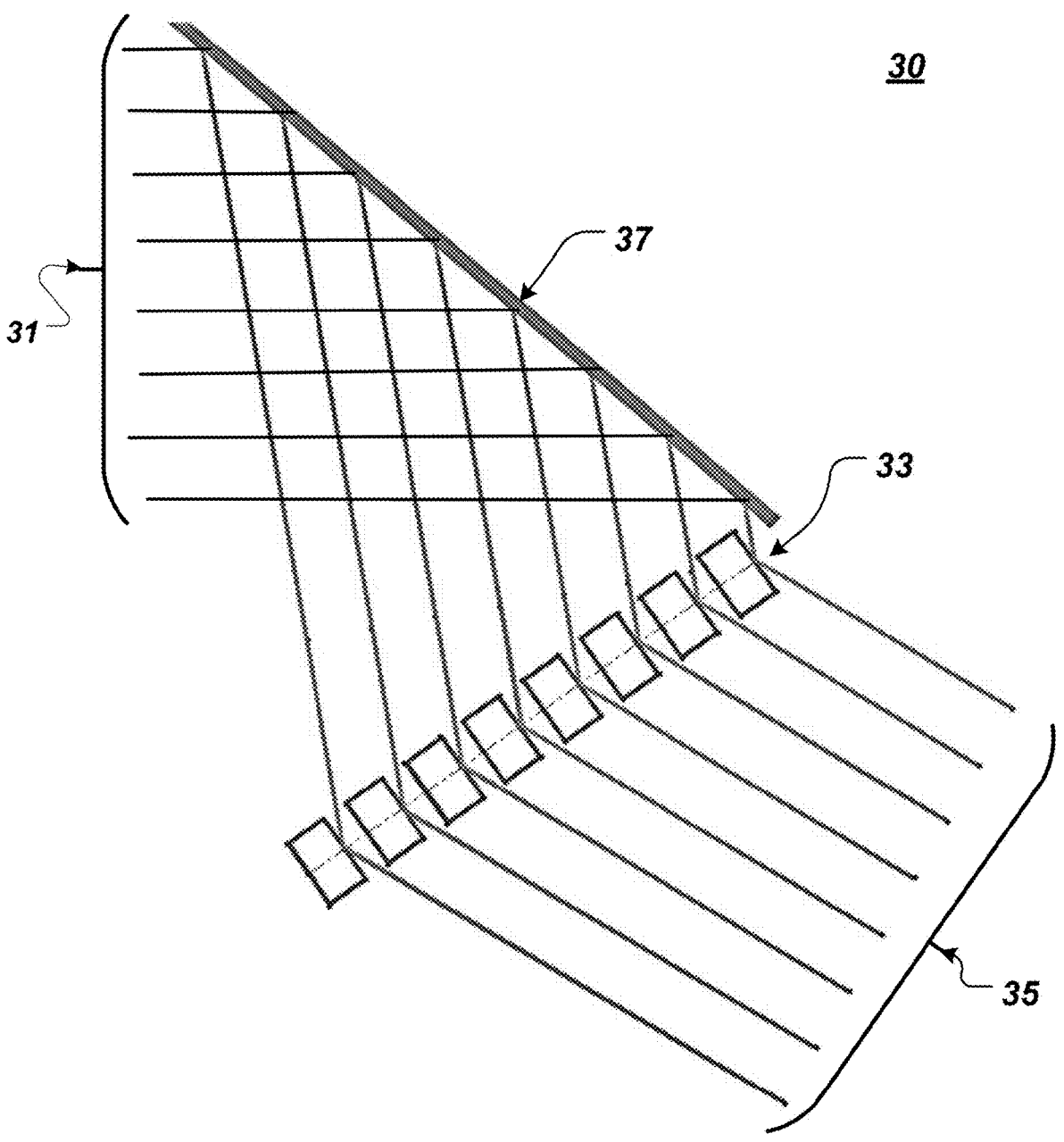
FIG. 5 shows a beam steering mirror array constructed according to the principles of the disclosure.

In at least one embodiment, the beamsplitter array 10 includes a second mirror (such as, for example, the reflector 37 seen in FIG. 5), which is positioned parallel to the mirror 12 such that the output beams 15 from the beamsplitters 14 impinge on the second mirror and are reflected to discrete microreflectors in a reflector array (such as, for example, the reflector array 35 seen in FIG. 5).

In the embodiment depicted in FIG. 3, the mirror 12 is positioned to receive and reflect the light beam 11 to the beamsplitter array 10. The beamsplitter 14-1 is positioned to receive at its first interface the reflected input light beam 11 (consisting of beams 15-1, 15-2, 15-3, 15-4 as components), emit a portion of the light beam (consisting of beam components 15-1 and 15-3) at its second interface (at the interface 17), select and reflect at the second interface the remaining portion of the light beam (consisting of beam components 15-2 and 15-4), and direct the reflected remaining portion, via the first interface, back to the mirror 12. The beamsplitter 14-1 is configured and sized such that it has sufficient width and length to receive and direct the entirety of the input light beam 11 (consisting of beam components 15-1, 15-2, 15-3, 15-4) to the interface 17, and redirect the reflected portion of the beam (consisting of components 15-2 and 15-4) back to the mirror 12; and sufficient thickness (or height) to select/reflect and redirect the reflected portion of the light beam (consisting of beam components 15-2 and 15-4), via its first interface, back to the mirror 12.

In a non-limiting embodiment, the beamsplitter 14-1 can be configured to have dimension of, for example, 7 mm×5.1 mm×2.9 mm. In various embodiments, the beam splitter 14-1 can have a width of 5.1 mm, a length of 7 mm, and a thickness (or height) of 2.8 mm. In various embodiments, the beamsplitter 14-1 has other dimensions, including width, length, and/or thickness that are greater and/or less than those in the foregoing example.

The beamsplitter 14-2 is positioned to receive at its first interface, at the interface 17, the portion of the light beam (consisting of beam components 15-1 and 15-3) from the beamsplitter 14-1 and direct the light beam portion to its second interface, where a part of the light beam portion, consisting of the beam component 15-1, is emitted as the output beam component 15-1 and the remaining part of the light beam portion, consisting of the beam component 15-3, is selected and reflected at the second interface and redirected back, via its first interface, to the mirror 12, which in turn reflects the beam component 15-3 as the output beam 15-3. As seen in FIG. 3, the beamsplitter 14-2 is positioned to also receive at its first interface the reflected portion of the light beam (consisting of beam components 15-2 and 15-4)

from the mirror 12, direct the received light beam portion to its second interface, where a part of the light beam portion, consisting of the beam component 15-2, is emitted as the output beam component 15-2 and the remaining part of the light beam portion, consisting of the beam component 15-4, is selected and reflected by the second interface, and redirected by the beamsplitter 14-2 back, via its first interface, to the mirror 12, which in turn reflects the beam component 15-4 as the output beam 15-4.

The beamsplitter 14-2 is configured and sized such that it has sufficient width and length to receive and direct the entireties of the light beam portion consisting of the beam components 15-1, 15-3, and the light beam portion consisting of the beam components 15-2 and 15-4, as seen in FIG. 3; and sufficient thickness (or height) to reflect and direct each of the beam components 15-1, 15-2, 15-3, and 15-4, as seen in FIG. 3. In a non-limiting embodiment, the beamsplitter 14-2 can be configured to have, for example, a width of 7 mm, a length of 12 mm, and a thickness (or height) of 2.8 mm. In various embodiments, the beamsplitter 14-2 has other dimensions, including width, length, and/or thickness that are greater and/or less than those in the foregoing example.

In at least one embodiment, the beamsplitter 14-1 can be sized to minimize its length, width, and thickness to minimum dimensions necessary to operate as depicted in FIG. 3, including to direct the entire input light beam 11 to the interface 17 and redirect the reflected portion of the input light beam (consisting of beam components 15-2 and 15-4) to the mirror 12. In the same embodiment, the beamsplitter 14-2 can be sized to minimize its length, width, and thickness to minimum dimensions necessary to: direct the beam components 15-1 and 15-3, and reflect the beam component 15-3; and direct the beam components 15-2 and 15-4, and reflect the input light beam 11 to the interface 17 and redirect the reflected portion of the input light beam (consisting of beam components 15-2 and 15-4) to the mirror 12.

In various embodiments, the beamsplitter 14-1 can be made significantly shorter than the beamsplitter 14-2 when measured along a longitudinal axis L, as seen in FIG. 3. In at least one embodiment, the beamsplitter 14-2 can be, for example, at least twice as long as the beamsplitter 14-1. In the at least one embodiment, the beamsplitter 14-1 and 14-2 can have the same width and thickness (or height) dimensions.

The beamsplitter array 10 is configured to maintain the pointing accuracy of each of the laser beam components 15-1, 15-2, 15-3, and 15-4 relative to each other, both in terms of position and angle, in the output laser beam array 15. As seen in FIG. 3, the incident angles of the mirror 12 and beamsplitter array 10 are optimized to allow minimum beam separation, maximum beamsplitter thickness for mounting stability, as well as the maximum beam path length compensation efficiency. Unlike state-of-the-art optical systems (for example, seen in FIGS. 1 and 2), the incident angles need not be 45°, but can have other angle values (as seen, for example, in FIG. 3), as those skilled in the art will understand in view of the instant disclosure.

Comparing the beamsplitter array 10 with the state-of-the-art beamsplitter array shown in FIG. 2, the beamsplitter array 10 can be made using beamsplitters 14-1, 14-2 with significantly larger dimensions (for example, two times or larger) than those in the state-of-the-art beamsplitter array, while at the same time achieving a smaller overall footprint that allows for a much more compact and efficient assembly, and a smaller enclosure within which to house the device. Moreover, the configuration of the beamsplitter array 10 facilitates its incorporation in a monolithic structure, such as, for example, the CTE-matched monolithic device 20 (shown in FIG. 4), which can be made of glass and constructed to minimize or eliminate differences in CTE values between the beamsplitter array 10 and the structure(s) that hold each of the components of the beamsplitter array 10, including the mirror 12 and the beamsplitter doublet 14.

When compared to the beamsplitter arrays of FIG. 1 or 2, the beamsplitter array 10 is able to split the input light beam 11 into a plurality of light beam components 15-1, 15-2, 15-3, 15-4, . . . , 15-$n$ (where n is positive integer greater than 4) with significantly narrower spacing between each output beam using similarly dimensioned beamsplitters. For example, with similar dimensioned beamsplitters 14-1, 14-2 in the beamsplitter doublet 14, the beamsplitter array 10 can split the input beam 11 into four output beams 15-1, 15-2, 15-3, 15-4, each spaced from an adjoining output beam by a distance that is close to the beam size, such as, for example, an order of magnitude of about 5 times the beam diameter. In various embodiments, the beamsplitter array 10 can include beamsplitters 14-1, 14-2 having dimensions significantly smaller than those of the embodiment depicted in FIG. 3, in which case smaller separation distances are achievable between the output beams 15, including significantly below (or above) 5 times the beam diameter are achievable with smaller beamsplitter sizes. In various embodiments, the laser beam can have, for example, a beam diameter of about 0.8 mm Although the beamsplitter array 10 depicted in the embodiment of FIG. 3 comprises a mirror 12 and a beamsplitter doublet 14, in various other embodiments the beamsplitter array 10 can include one, two, three, four, or more beamsplitters and one, two, three, or more mirrors. In each of those embodiments, the beamsplitter array 10 is configured to split one or more input laser beams 11 into one or more rows of equally spaced identical laser beams, while maintaining the pointing accuracy of each output beam relative to all other beams, both position-wise and angle-wise.

Figure 4:
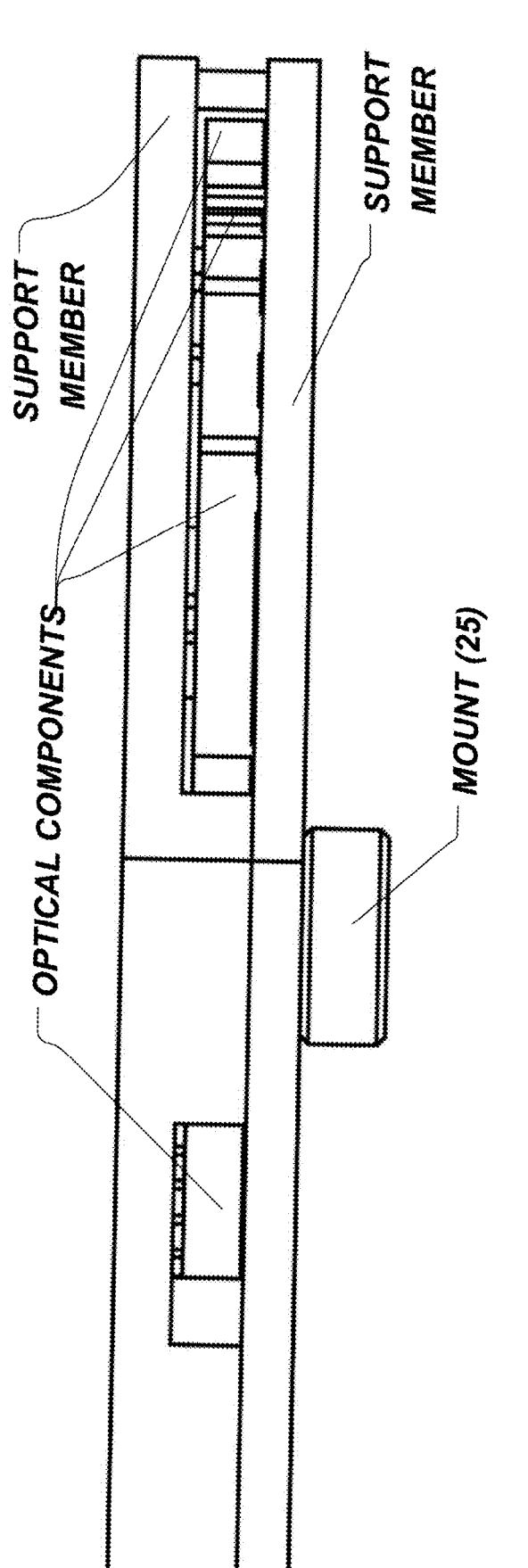
FIG. 4 shows a CTE-matched monolithic device constructed according to the principles of the disclosure.

FIG. 4 shows a nonlimiting embodiment of a CTE-matched monolithic device 20, constructed according to the principles of the disclosure. The device 20 comprises an optically prealigned monolithic structure where all of the optical components and support members are made from the same CTE-matched optical materials, and permanently incorporated into a compact, lightweight, sandwich like monolithic structure, creating superb optical and thermal stability, as well as unsurpassed shock and vibration resistance. In at least one embodiment, the optical components include the beamsplitters 14-1, 14-2 and the mirror 12 (shown in FIG. 3), all of which are assembled and optically prealigned between a pair of planar support members. One of the planar support members is configured with a side that attaches to an end of each of the beamsplitters 14-1, 14-2, the mirror 13, and any other optical components (such as, for example, the reflector 37, discussed below); and the other planar support member is configured with a side that attaches to an opposite end of each of the beamsplitters 14-1, 14-2, the mirror 13, and the other optical components, such that all of the optical components are sandwiched therebetween, in fixed optical alignment.

The monolithic CTE matched design allows the device 20 to achieve maximum optical performance and stability, minimizing beam deviation to sub are second and the beam shift to nanometer accuracy with minimal variation of optical specifications in the most extreme environments, where large thermal excursion, high shock and vibration are the typical operating conditions.

The pre-aligned monolithic invariant design of the device 20 simplifies the integration of the optical sub-system (for example, comprising beamsplitters and mirrors) within larger photonic systems by eliminating the need for precision alignment of sources, detectors, and the like.

In various embodiments, the CTE matched monolithic device 20 can include a mount 25 that is configured to attach the device 20 to a support (not shown). The mount 25 comprises a structure that fixedly and securely holds the device 20. The mount 25 can include a cylindrical shape that can be installed into a support (not shown) having a receiver, such as, for example, but not limited to, the component mount system 100 described in co-pending U.S. patent application Ser. No. 18/668,437, filed May 20, 2024.

FIG. 5 shows a nonlimiting embodiment of a multibeam steering mirror (MSM) array assembly 30, constructed according to the principles of the disclosure. The MSM array assembly 30 is configured to receive a plurality of laser beams 31, such as, for example, the laser beams 15 output from the beamsplitter array 10 (shown in FIG. 3) or the CTE-matched monolithic device 20 (shown in FIG. 4), and individually steer each of the plurality of laser beams by means of a reflector assembly 33 to output a respective plurality of position-controlled (PC) laser beams 35. The MSM array assembly 30 can include a reflector 37. Depending on, for example, space considerations, the reflector 37 can be configured at an angle (such as, for example, about 60-degree incident angle) with the reflector assembly 33 to minimize the space needed to house the MSM array assembly 30. The angle can be set to compensate path length differences and/or compress beam separation.

In certain embodiments of the CTE-matched monolithic device 20 (seen in FIG. 3), the CTE-matched monolithic structure includes the reflector 37, in addition to the support members, mirror 12, and beamsplitters 14-1, 14-2, wherein all of the optical components and support members are made of the same material (for example, glass). In certain embodiments, the optical components and support members can be made of materials with substantially the same or similar CTE values. The reflector 37 can be configured to be parallel to the mirror 12 (shown in FIG. 3).

Referring to FIGS. 3-5 concurrently, the CTE-matched monolithic device 20 can be preassembled and aligned optically with the MSM array assembly 30. In the embodiment of the CTE-matched monolithic device 20 comprising the reflector 37, the device 20 can be preassembled and prealigned optically, such that when assembled with the reflector assembly 30 each of the beams 31 reflected by the reflector 37 is directed to the centroid of a corresponding microreflector in the reflector assembly 33.

The reflector assembly 33 includes a plurality of micoreflectors, each configured to receive one of the plurality of laser beams and steer (including direct or redirect) that beam to a determined spot on a two-dimensional (2 D) plane, or a spot in a three-dimensional (3 D) space, depending on the particular application. The reflector assembly 33 can include, for example, an array of micromirror devices, micro-electro-mechanical system (MEMS) mirror devices, microprisms, micro-beamsplitter devices, or non-planar mirrors to focus or otherwise re-form the beam.

In various embodiments, the reflector 37 includes a mirror or another beamsplitter. As noted above, the reflector 37 can be positioned and configured to be parallel to the mirror 12 (shown in FIGS. 3 and 6). As discussed above, the reflector 37 can be installed in the monolithic structure of the device 20 together with the other optical components, including beamsplitter array 10 and mirror 12.

FIG. 6 shows a nonlimiting embodiment of an optical system 50 comprising a beamsplitter array and multibeam steering mirror (MSM) array assembly, constructed according to the principles of the disclosure. As with the beamsplitter array 10 (FIG. 3), CTE-matched device 20, and MSM array assembly 30, the embodiment depicted in FIG. 6 is configured to enable the creation of a row of equally spaced identical laser beams, while maintaining the pointing accuracy of the individual beams relative to each other, both position-wise and angular-wise. As seen, the optical system 50 includes a steering microreflector 33 for each output beam to provide adjustment of each output beam 35 for the pointing accuracy and beam separation.

In the embodiment depicted in FIG. 6, the beamsplitter array includes the mirror 12, the reflector 37, and four beamsplitters 14-1, 14-2, 14-3, and 14-4 (collectively referred to as beamsplitters 14), all of which are preassembled and optically prealigned within a monolithic CTE-matched structure, such as, for example, the CTE-matched device 20 (shown in FIG. 4). In at least one embodiment, the monolithic CTE-matched structure can be assembled and optically aligned such that each light beam from the reflector 37 is optically aligned with the centroid of the corresponding, respective microreflector in the reflector assembly 33. Each microreflector in the reflector assembly 33 is configured to reflect and individually steer the impinging light beam, such that the reflector assembly 33 outputs the plurality of position-controlled (PC) laser beams 35, including adjusting each output beam to provide pointing accuracy and beam separation.

In the optical system 50, the reflector assembly 33 is configured to compress the separation between the beams via each of its microreflectors (as seen in FIG. 6), thereby compensating for path length differences of the individual beams, achieving minimal beam separation, and correcting any misalignment of an individual beam. Depending on, for example, space considerations, the mirror 12, beamsplitters 14, and reflector 37 can be assembled (and optically aligned) at angles to minimize the footprint of, and thereby the space needed to house, the optical system 50.

Figure 7:
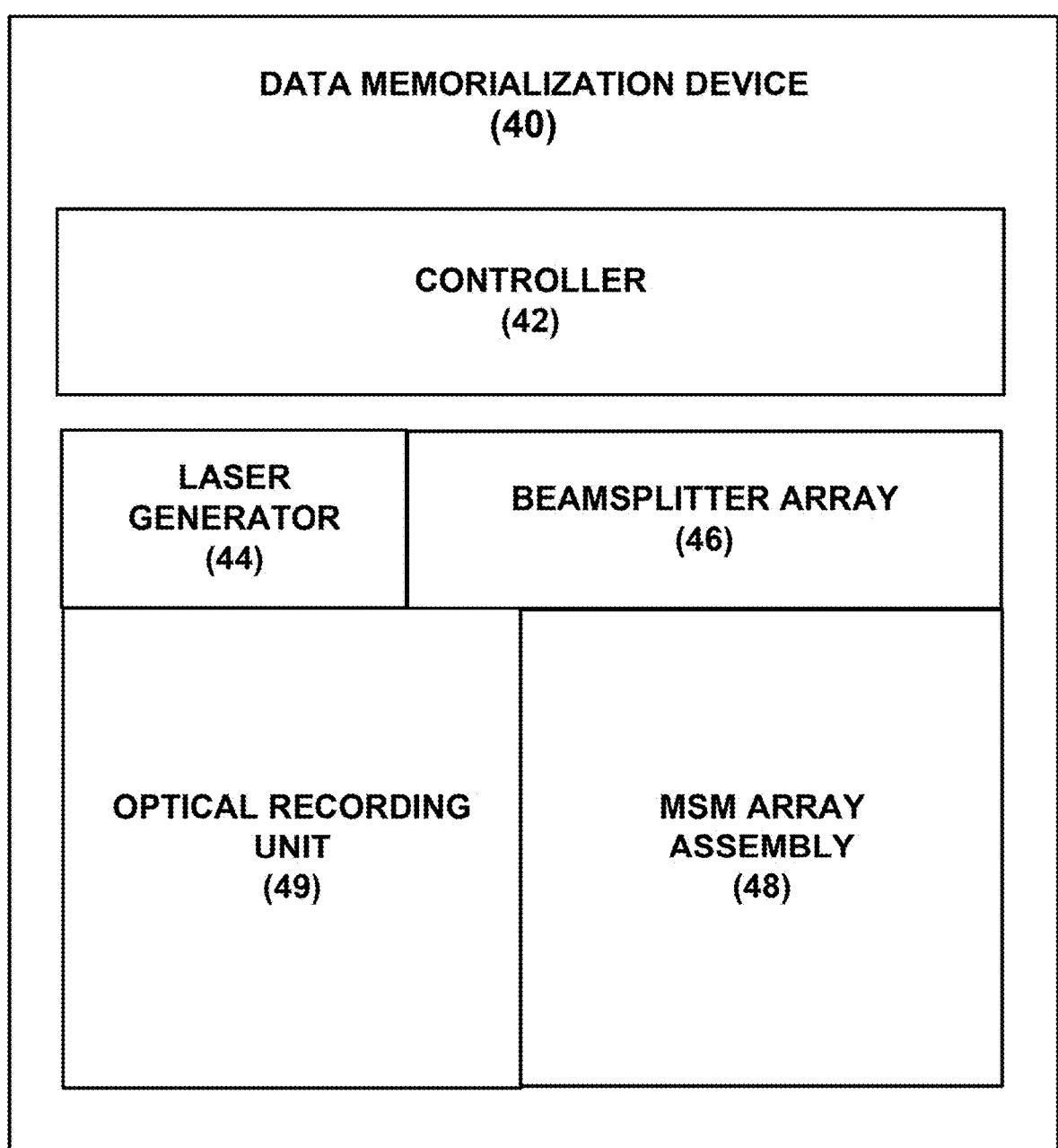
FIG. 7 shows a data memorialization device, according to the principles of the disclosure.

FIG. 7 shows a nonlimiting embodiment of a data memorialization (DM) device 40, constructed according to the principles of the disclosure. The DM device 40 includes a controller 42, a laser generator 44, a beamsplitter array 46, a MSM (multibeam steering mirror) array assembly 48, and an optical recording unit 49. The controller 42 includes the digital memorialization controller 100 (shown in FIG. 8).

In various embodiments, the beamsplitter array 46 includes the beamsplitter array (shown in FIG. 3 or 6). The MSM array assembly 48 can include the MSM array assembly 30 (shown in FIG. 5).

In at least one embodiment, the beamsplitter array (seen in FIG. 3 or 6) and the reflector 37 (seen in FIG. 6) are included in the DM device 40 as a monolithic CTE-matched structure, such as the CTE-matched device 20 (seen in FIG. 4).

In all embodiments, the laser generator 44, beamsplitter 46, MSM array assembly 48, and optical recording unit 49 are positioned and aligned optically.

Operating under instructions of the controller 42, a laser beam can be generated by the laser generator 44 based on a digital signal received by the DM device 40. The laser beam can be directed, from the laser generator 44, along an optical path to the beamsplitter array 46, which splits the laser beam into a plurality of laser beams and directs the beams to the MSM array assembly 48. The MSM array assembly 48, which can include the assembly 30 (shown in FIGS. 5 and 6), steers each of the plurality of laser beams to a multidimensional space (for example, 2 D or 3 D,) of a recording medium (not shown) in the optical recording unit 49, and, for example, using short laser pulses, writes data to the recording medium.

In certain embodiments, the recording medium includes a glass medium such as, for example, a glass plate, glass sheet, or glass disc. The plurality of laser beams, each comprising short pulses, are steered by the MSM array assembly 48 to determined spots on/in the glass medium in the optical recording unit 49 to imprint the digital data as voxels (3 D pixels) inside the glass medium. The optical recording unit 49 can include one or more glass mediums (for example, glass plates), and one or more components (not shown) configured to install and position the glass medium for writing and, once finished, remove or replace the glass with a new glass for writing. The optical recording unit 49 can include a translational x-y-z support and drive, which can move the glass medium through a plurality of discrete positions in the 3 D x-y-z space, including moving the recording medium along in the x-y, x-z, and y-z planes.

An example of writing in glass plates using voxels is the Microsoft® Project Silica.

The DM device 40 can be configured (e.g., like the beamsplitter array 10, CTE-matched device 20, MSM array assembly 30, and/or optical system 50) to create a series of compensating beam paths for the output beams. For example, like the beamsplitter array 10, the beamsplitter array 46 can be configured to add the most amount of path length to the left most output beam and add the least amount of path length to the right most output beam, as seen in FIG. 3.

In various embodiments, the DM device 40 is configured to write/read to/from, for example, a glass substrate, that memorializes (or records) data in one or more planes of the memorization structure-such as, for example, 1, 2, 3, . . . 20, 21, . . . , or more planes depth-wise of the glass substrate. The memorization structure can be read using, for example, the same (or different) MSM array assembly 48 and/or beamsplitter array 46. Each reflector assembly can include a mirror array configured to be controlled at the micromirror level such that a single output beam can be adjusted to correct for misalignment due to, for example, changes in temperature, pressure, vibration, and the like.

Figure 8:
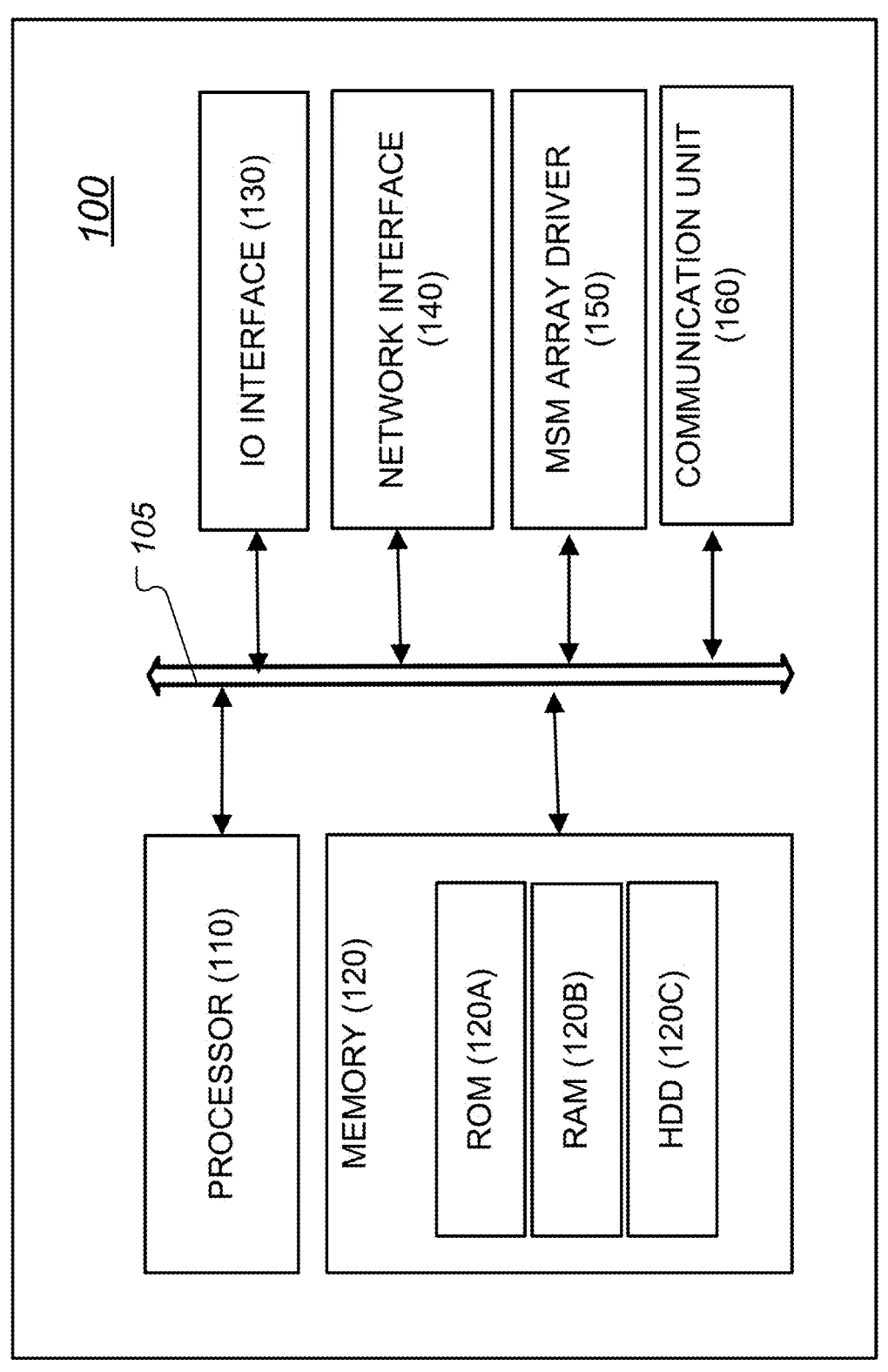
FIG. 8 shows a data memorialization controller, according to the principles of the disclosure.

FIG. 8 shows a block diagram of a nonlimiting embodiment of a data memorialization controller (DMC) 100 configured according to the principles of the disclosure. The DMC 100 can include a plurality of computer resource assets, including a bus 105, a processor 110, a memory 120, an input-output (IO) interface 130, a network interface 140, a multibeam steering mirror (MSM) array driver 150, and a communication unit 160. Any of the computer resources assets 110 to 160 can be interconnected using a bus 105, or various communication links, including buses, and can be mounted on a common motherboard or in another manner, as appropriate.

The processor 110 can be arranged to execute instructions and process data within the controller 100, including instructions stored in the memory 120. The processor 110 can be configured to execute instructions and process data. The processor 110 can be arranged to interact with, or generate and send instruction signals to, for example, the communication unit 160 to receive and/or transmit instruction signals and digital signals to one or more communication devices (not shown) directly or via a network (not shown).

The processor 110 can be configured to parse digital signals into digital data to be written and, via the MSM array driver 150, write the digital data into the glass medium in the optical recording unit 49 (shown in FIG. 7) as voxels.

The memory 120 can include a read-only memory (ROM) 120A, a random-access memory (RAM) 120B, and a hard disk drive (HDD) 120C. The memory 120 can provide nonvolatile storage of data, data structures, and computer-executable instructions, and can accommodate the storage of any data in a suitable digital format. The memory 120 can include a computer-readable medium that can hold executable or interpretable computer code (instructions) that, when executed by the processor 110, cause the steps, processes and methods of the various embodiments in this disclosure to be carried out. The computer-readable medium can be contained in the memory 120, and can include sections of computer code that, when executed by the processor 110, cause the controller 100 to drive (via the MSM array driver 150) each microreflector in the microrefelctor assembly 33 (shown in FIG. 5) to steer a respective beam (e.g., comprising short pulses) to a spot in the glass medium.

A basic input-output system (BIOS) can be stored in the ROM 120A, which can include, for example, a non-volatile memory, an erasable programmable read-only memory (EPROM), or an electrically erasable programmable read-only memory (EEPROM). The BIOS can contain the basic routines that help to transfer information between any one or more of the computing resource assets in the controller 100, such as during start-up.

The RAM 120B can include, for example, dynamic random-access memory (DRAM), a synchronous dynamic random-access memory (SDRAM), a static random-access memory (SRAM), or a nonvolatile random-access memory (NVRAM) for caching data.

The HDD 120C can include, for example, an enhanced integrated drive electronics (EIDE) drive or any suitable hard disk drive for use with the particular application. The HDD 120C can be configured for external use in a suitable chassis (not shown).

A computer program product can be tangibly embodied in a non-transitory computer-readable medium, which can be contained in the memory 120, or provided as an external computer resource asset and connected to the bus 105. The computer program product can contain instructions that, when executed, perform one or more methods or operations, such as those included in this disclosure.

Any number of computer resources can be stored in the memory 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 120B as executable sections of computer code.

The input-output (IO) interface 130 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 130 as instruction to data signals, via the bus 105, to any of the computer resource assets in the controller 100.

The network interface 140 can be connected to a network, such as, for example, a residential, industrial, institutional, or other local area network (LAN), which can connect to the Internet. The network interface 140 can include a wired or a wireless communication network interface (not shown) or a modem (not shown). When used in a LAN, the controller 100 can be connected to the LAN network through the wired or wireless communication network interface; and, when used in a wide area network (WAN), the controller 100 can be connected to the WAN network through the modem. The modem (not shown) can be internal or external and wired or wireless. The modem can be connected to the system bus 105 via, for example, a serial port interface (not shown). The network interface 140 can include a receiver (not shown), a transmitter (not shown) or a transceiver (not shown). The modem, receiver, transmitter, and/or transceiver can be included in the communication unit 160.

The MSM array driver 150 is configured to generate a plurality of mirror drive signals (e.g., a drive signal for each microreflector in the microreflector assembly 33 seen in FIG. 5 or 6) based on a received digital signal. Each generated mirror drive signal can be applied to a respective microreflector in the reflector assembly 33 (shown in FIG. 5) to steer the microreflector to a 3 D position in the glass medium until a voxel is formed and move to a next 3 D position to write the next voxel in the glass medium.

The communication unit 160 is configured to communicate and exchange instructions and data signals with one or more communication devices (not shown) external to the controller 100.

The terms "a," "an," and "the," as used in this disclosure, means "one or more," unless expressly specified otherwise.

The term "bus," as used in this disclosure, means any of several types of bus structures that can further interconnect to a memory bus (with or without a memory controller), a peripheral bus, or a local bus using any of a variety of commercially available bus architectures.

The term "communicating device" or "communication device," as used in this disclosure, means any computing device, hardware, or computing resource that can transmit or receive digital or analog signals or data packets, or instruction signals or data signals over a communication link. The device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM, SMS, EMS, MMS, CDMA, TDMA, PDC, WCDMA, CDMA2000, GPRS, WiFi, WiMAX, IEEE 802.11, DECT, 0G, 1G, 2G, 3G, 4G, 5G or 6G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules, which can be capable of manipulating data according to one or more instructions, such as, for example, without limitation, a processor, an application specific integrated circuit (ASIC), a field programmable gate array (FPGA), a microprocessor (μP), a central processing unit (CPU), a graphic processing unit (GPU), a general purpose computer, a super computer, a personal computer, a laptop computer, a palmtop computer, a notebook computer, a smart phone, a mobile phone, a tablet, a desktop computer, a workstation computer, a server, a server farm, a computer cloud, or an array of processors, ASICs, FPGAs, μPs, CPUs, GPUs, general purpose computers, super computers, personal computers, laptop computers, palmtop computers, notebook computers, desktop computers, workstation computers, or servers. A computer or computing device can include hardware, firmware, or software that can transmit or receive data packets or instructions over a communication link. The computer or computing device can be portable or stationary.

The term "computer asset," as used in this disclosure, means a computer resource, a computing device, a communicating device, or a computer-readable medium.

The term "computer resource," as used in this disclosure, means software, a software application, a web application, a webpage, a document, a file, a record, an application program(ming) interface (API), web content, a computer application, a computer program, computer code, machine executable instructions, or firmware. A computer resource can include an information resource. A computer resource can include machine instructions for a programmable computing device, and can be implemented in a high-level procedural or object-oriented programming language, or in assembly/machine language.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

References in the disclosure to "one embodiment," "an embodiment," "an example embodiment," or "example," indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. An optical system for creating a plurality of equally spaced identical laser beams while maintaining pointing accuracy of the laser beams relative to each other with respect to both position and angle, the optical system comprising:
   a monolithic optical structure that includes:
      a mirror having a reflective surface configured to receive a laser beam in a first direction and reflect the laser beam in a second direction; and
      a beamsplitter array comprising:
         a first beamsplitter, having a first interface and a second interface, configured to receive the laser beam from the mirror at the first interface and direct the laser beam to the second interface, the second interface being configured to emit a first laser beam portion and redirect a second laser beam portion, via the first interface, to the mirror; and
         a second beamsplitter, having a first interface and a second interface, configured to receive, at its first interface, the first laser beam portion from the second interface of the first beamsplitter and the second laser beam portion from the mirror and direct the first laser beam portion and the second laser beam portion to its second interface, the second interface being configured to emit a first part of the first laser beam portion and a first part of the second laser beam portion and redirect a second part of the first laser beam portion and a second part of the second laser beam portion, via the first interface, to the mirror,
      wherein the mirror is configured to reflect the second part of the first laser beam portion and the second part of the second laser beam portion, and
      wherein the second interface of the first beamsplitter adjoins the first interface of the second beamsplitter.

2. The optical system of claim 1, further comprising an intermediary interface positioned between and in contact with each of the second interface of the first beamsplitter and the first interface of the second beamsplitter.

3. The optical system of claim 1, wherein the monolithic optical structure further includes a plurality of support members, including a pair of planar support members.

4. The optical system of claim 3, wherein the mirror and the beamsplitter array are preassembled, optically pre-aligned, and fixed between the pair of planar support members.

5. The optical system of claim 4, wherein the mirror and the beamsplitter array are made of a material having a coefficient of thermal expansion (CTE) that is the same or substantially the same as a coefficient of thermal expansion of the pair of planar support members.

6. The optical system of claim 5, wherein the monolithic optical structure further includes a reflector, the reflector being made of a material having a coefficient of thermal expansion that is the same or substantially the same as the coefficients of thermal expansion of the mirror, the beamsplitter, and the pair of support members.

7. The optical system of claim 6, wherein the material comprises glass.

8. The optical system of claim 6, wherein the laser beam comprises a first beam component, a second beam component, a third beam component, and a fourth beam component, and the reflector is configured to receive and redirect:
   the first part of the first laser beam portion from the second interface of the second beamsplitter to a first microreflector to output the first beam component;

the first part of the second laser beam portion from the second interface of the second beamsplitter to a second microreflector to output the second beam component;

the second part of the first laser beam portion from the mirror to a third microreflector to output the third beam component; and the second part of the second laser beam portion from the mirror to a fourth microreflector to output the fourth beam component, wherein each of the first, second, third, and fourth microreflectors are configured to provide a similar or the same path length for each of the first, second, third, and fourth beam components.

9. The optical system of claim 1, further comprising:

a reflector having a mirror surface configured to receive and redirect:

the first part of the first laser beam portion from the second interface of the second beamsplitter to a first microreflector to output a first beam component;

the first part of the second laser beam portion from the second interface of the second beamsplitter to a second microreflector to output a second beam component;

the second part of the first laser beam portion from the mirror to a third microreflector to output a third beam component; and the second part of the second laser beam portion from the mirror to a fourth microreflector to output a fourth beam component, wherein each of the first, second, third, and fourth microreflectors are configured to provide a similar or the same path length for each of the first, second, third, and fourth beam components.

10. The optical system of claim 1, wherein the beamsplitter array comprises a third beamsplitter having a first interface and a second interface, wherein the first interface of the third beamsplitter is configured to receive the first part of the first laser beam portion from the second interface of the second beamsplitter and emit a component of the first part of the first laser beam portion and redirect another component of the first laser beam back to the first interface of the third beamsplitter.

11. The optical system of claim 10, wherein the beamsplitter array comprises a fourth beamsplitter.

12. The optical system of claim 11, wherein a first interface of the fourth beamsplitter adjoins the second interface of the third beamsplitter.

13. The optical system of claim 12, wherein the first interface of the third beamsplitter adjoins the second interface of the second beamsplitter.

14. The optical system of claim 10, wherein the first interface of the third beamsplitter adjoins the second interface of the second beamsplitter.

15. An optical system for creating a plurality of equally spaced identical laser beams while maintaining pointing accuracy of the laser beams relative to each other with respect to both position and angle, the optical system comprising:

a mirror having a reflective surface configured to receive a laser beam in a first direction and reflect the laser beam in a second direction; and a beamsplitter array comprising:

a first beamsplitter, having a first interface and a second interface, configured to receive the laser beam from the mirror at the first interface and direct the laser beam to the second interface, the second interface being configured to emit a first laser beam portion and redirect a second laser beam portion, via the first interface, to the mirror; and a second beamsplitter, having a first interface and a second interface, configured to receive, at its first interface, the first laser beam portion from the second interface of the first beamsplitter and the second laser beam portion from the mirror and direct the first laser beam portion and the second laser beam portion to its second interface, the second interface being configured to emit a first part of the first laser beam portion and a first part of the second laser beam portion and redirect a second part of the first laser beam portion and a second part of the second laser beam portion, via the first interface, to the mirror;

a reflector assembly configured to redirect a plurality laser beam components from the beamsplitter array and the mirror and output equally spaced identical laser beams, while maintaining pointing accuracy of the laser beams relative to each other, both position wise and angular wise.

16. The optical system of claim 15, further comprising an intermediary interface positioned between and in contact with each of the second interface of the first beamsplitter and the first interface of the second beamsplitter.

17. The optical system of claim 15, further comprising:

a monolithic optical structure having a pair of support members, wherein the monolithic optical structure comprises the mirror and the beamsplitter array sandwiched between the pair of support members and fixedly held in optical alignment, and wherein each of the mirror, the beamsplitter array, and the pair of support members are each made of a material having a similar or the same coefficient of thermal expansion.

18. The optical system of claim 17, wherein the monolithic optical structure further includes a reflector, the reflector being made of a material having a coefficient of thermal expansion that is the same or substantially the same as the coefficients of thermal expansion of the mirror, the beamsplitter, and the pair of support members.

19. The optical system of claim 18, wherein the mirror, the beamsplitter array, and the pair of support members each comprise glass.

20. The optical system of claim 15, wherein the laser beam comprises a first beam component, a second beam component, a third beam component, and a fourth beam component, and the reflector assembly comprises a plurality of micromirror devices configured to receive:

the first part of the first laser beam portion at a first micromirror device and output the first beam component;

the first part of the second laser beam portion at a second micromirror device and output the second beam component;

the second part of the first laser beam portion at a third micromirror device and output the third beam component; and the second part of the second laser beam portion at a fourth micromirror device and output the fourth beam component, wherein each of the first, second, third, and fourth microreflectors are configured to provide a similar or the same path length for each of the first, second, third, and fourth beam components.

* * * * *